(12) United States Patent
Pickering et al.

(10) Patent No.: US 9,166,871 B2
(45) Date of Patent: Oct. 20, 2015

(54) DATA COMMUNICATION

(71) Applicant: British Telecommunications Public Limited Company, London (GB)

(72) Inventors: Ashley Pickering, Ipswich (GB); Trevor Philip Linney, Stowmarket (GB); Christopher Marcus Croot, Bury St. Edmunds (GB); Philip Anthony Everett, Ipswich (GB); Gary John Dalby, Ipswich (GB)

(73) Assignee: British Telecommunications PLC, London (GB)

( * ) Notice: Subject to any disclaimer, the term of this patent is extended or adjusted under 35 U.S.C. 154(b) by 255 days.

(21) Appl. No.: 13/759,572

(22) Filed: Feb. 5, 2013

(65) Prior Publication Data
US 2013/0215773 A1 Aug. 22, 2013

Related U.S. Application Data

(62) Division of application No. 12/525,108, filed as application No. PCT/GB2008/000208 on Jan. 22, 2008, now Pat. No. 8,462,648.

(30) Foreign Application Priority Data

Feb. 1, 2007 (EP) .................................... 07250428

(51) Int. Cl.
| | |
|---|---|
| *H04L 1/00* | (2006.01) |
| *H04L 12/24* | (2006.01) |
| *H04M 11/06* | (2006.01) |
| *H04M 3/22* | (2006.01) |
| *H04M 3/30* | (2006.01) |
| *H04L 12/26* | (2006.01) |

(52) U.S. Cl.
CPC ............ *H04L 41/06* (2013.01); *H04L 41/0816* (2013.01); *H04L 41/0843* (2013.01); *H04M 3/2227* (2013.01); *H04M 3/304* (2013.01); *H04M 11/062* (2013.01); *H04L 43/16* (2013.01)

(58) Field of Classification Search
USPC .................................. 370/464, 230, 237, 236
See application file for complete search history.

(56) References Cited

U.S. PATENT DOCUMENTS

| | | | |
|---|---|---|---|
| 7,529,259 B2 | 5/2009 | Van Acker et al. | |
| 2005/0123027 A1 | 6/2005 | Cioffi et al. | |
| 2005/0237940 A1* | 10/2005 | Tennyson | ...................... 370/235 |

(Continued)

OTHER PUBLICATIONS

International Search Report for PCT/GB2008/000208, mailed Aug. 4, 2008.
"Dynamic Line Management for Digital Subscriber Lines", Alcatel, [Online], Apr. 8, 2005, pp. 1-10, XP002442256, Retrieved from the Internet.
T. Bostoen et al., "Optimizing DSL for Multimedia Services", Alcatel Telecommunications Review, Jun. 13, 2005, pp. 155-159, XP008081287.

(Continued)

*Primary Examiner* — Zewdu A Beyen
(74) *Attorney, Agent, or Firm* — Nixon & Vanderhye PC

(57) ABSTRACT

A management device is used in an access network including a plurality of data connections between end user devices and an aggregation transceiver device where the connections are aggregated for onward connection through the access network. The access network stores a plurality of different profiles, each of which specifies a set of values for a plurality of parameters associated with each data connection. The device applies one of the stored profiles to each connection, and receives a notification in the event of one of a predetermined set of notifiable events occurring on the connection. It is determined if more than a predetermined number of notifications are received within a predetermined period for a respective connection and, in the event of such a determination being made, a different one of the profiles is caused to be applied to the connection.

17 Claims, 4 Drawing Sheets

(56) References Cited

U.S. PATENT DOCUMENTS

| | | |
|---|---|---|
| 2006/0121879 A1 | 6/2006 | Tseitlin et al. |
| 2006/0198430 A1 | 9/2006 | Rhee et al. |
| 2007/0264938 A1* | 11/2007 | Srinivasan et al. ......... 455/67.11 |
| 2010/0034216 A1 | 2/2010 | Pickering et al. |

OTHER PUBLICATIONS

Minutes of Oral Proceedings issued Feb. 10, 2012 in corresponding European Application No. 08701884.2.

Intention to Grant a European Patent issued on Feb. 22, 2012 in corresponding European Application No. 08701884.2.

* cited by examiner

DATA COMMUNICATION

CROSS-REFERENCES TO RELATED APPLICATIONS

This application is a divisional of application Ser. No. 12/525,108 filed Jul. 30, 2009, which is the National Phase of International Application No. PCT/GB2008/000208 filed Jan. 22, 2008, which claims priority to European Application No. 07250428.5 filed Feb. 1, 2007, the entire contents of each of which are hereby incorporated by reference in this application.

FIELD OF THE INVENTION

The present invention relates to data communication. In particular, it relates to the management of an access network including Digital Subscriber Line (DSL) connections.

BACKGROUND

Dynamic Line Management (DLM) is a technique for improving the stability of DSL connections. It is particularly useful when operating DSL connections at close to their maximum speed, because under these conditions external noise affecting the transmitted signal can cause the transceivers to be unable to successfully recover the signal to be transmitted with sufficient reliability to enable the connection to be maintained. If this occurs, the connection needs to be re-established. This is referred to as a re-synch and the user notices a temporary loss of service while the connection is re-established. Re-synchs are generally found to be particularly annoying by end users.

DLM seeks to minimise such re-synchs by automatically analysing DSL connections (especially the rate of occurrence of re-synchs) and varying certain parameters which can affect the likelihood of re-synchs occurring (for example the depth of interleaving, the amount of redundancy built into the encoding used, etc.). Typically, this is done by using a number of different profiles having various different sets of values for the parameters most likely to have an impact on the stability or otherwise of a DSL connection and moving a particular connection between different profiles until a profile is found which has an acceptable stability. The profiles are applied at the local exchange (sometimes referred to—especially in the USA—as the central office) usually within a piece of equipment known as a Digital Subscriber Line Access-Multiplexer (DSLAM) which houses a number of DSL transceiver units as is well known in the art.

Typically, the profiles are conceptually able to be thought of as ranging between more aggressive and less aggressive, where the more aggressive profiles tend to provide better services to the user (in terms of especially higher bit rates and lower latencies) but are more likely to result in the line being unstable, whereas less aggressive profiles tend to offer lower bit rates and/or latencies but greater stabilities.

An Alcatel Technology White Paper entitled "Dynamic Line Management for Digital Subscriber Lines" discusses DLM and suggests in overview an implementation in which there is a Validation Phase and an Operations phase. In the validation phase a connection is monitored fairly intensively. However, when discussing this aspect the paper states: "With unlimited resources, every line in the network could be closely monitored. In reality every line cannot be polled every 10 seconds to monitor QoS. In fact, this regularity is unnecessary. The ideal frequency for determining line instabilities is four hours. The ideal frequency for determining if a line is stable, is seven days. This is an ideal amount of time as it allows for anomalies in the network, including impulse noise (which can vary depending upon the time of day) and crosstalk (which is higher on weekends when most modems are active). A one week validation will also result in more accurate diagnosis of line quality."

However, the present inventors have determined that there are some situations in which this type of monitoring for DLM purposes is less than ideal.

SUMMARY

According to a first aspect of an exemplary embodiment, there is provided a method of operating an access network including a plurality of data connections between end user devices and an aggregation transceiver device where the connections are aggregated for onward connection through the access network, the method comprising storing a plurality of different profiles each of which specifies a set of values for a plurality of parameters associated with each data connection; and, in respect of each of the connections, performing the following steps: applying one of said stored profiles to the connection, generating a notification in the event of one of a predetermined set of notifiable events occurring on the connection, determining if more than a predetermined number of notifications are generated within a predetermined short term period and, in the event of such a determination being made, applying a different one of said profiles to the connection.

Preferably, the data connections are digital subscriber lines including remote and central transceiver units connected over a copper pair and operating in accordance with one or more of the various xDSL standards agreed by the International Telecommunication Union (ITU) (e.g. G.992.x and their annexes). Preferably the aggregation transceiver device is a Digital Subscriber Line Access Multiplexer (DSLAM).

Preferably the profiles are ranked according to a level of aggressiveness, where more aggressive profiles are, in general, more likely to result in a connection becoming unstable. Preferably the method of changing the profile applied comprises selecting a new profile which is ranked two places below the profile currently applied to the connection in terms of its aggressiveness. Preferably the set of notifiable events comprises a spontaneous resynch in which the connection deteriorates to a point where the connection needs to be automatically re-established by the remote and central transceiver units of the connection. Preferably the predetermined short term period is less than four hours; more preferably the short term period is less than 2 hours and most preferably it is approximately one hour in duration. Preferably the predetermined number of notifications is three or more and most preferably it is ten.

Preferably the method further includes monitoring the performance of each connection over a predetermined medium term period (which is preferably of the order of a day or a few days), processing the data to generate a summary of the performance of the connection over the medium term period and periodically analysing the summary data during a longer term period comprising a plurality of the medium term periods in order to identify longer term optimum profiles for applying to each connection.

The preferred embodiments of the present invention use a two-fold approach to Dynamic Line Management (DLM) in which connections which are very unstable are very quickly moved to a lower aggressiveness profile (i.e. to a less aggressive profile) in order to try to make them behave reasonably stably within a relatively short period of time (preferably within an hour or two) whilst a longer (medium term) period of time is used for the majority of connections, which are not chronically unstable, in order to experience the benefits referred to in the Alcatel technology white paper referred to above. Preferably the two distinct management processes also collect data in different ways, with the short scale (short term) process for detecting and correcting very unstable connections working by actively receiving and processing in real time a small number of notifications (i.e. only a small set of notifiable events, preferably spontaneous resynchronisations) whilst the longer scale process collects data over a medium term period and then periodically performs a bulk processing of the collected data which can include a greater amount of data than simply the occurrence of a small set of notifiable events. For example, in addition to monitoring simply the occurrence of resynchronisations, it could also monitor the number of errors on the line (possibly distinguishing between errors corrected using a Forward Error Correction (FEC) mechanism and uncorrected errors (which may be further distinguished between errors which couldn't be corrected despite an FEC mechanism being used, and errors which were not protected by an FEC mechanism); the total amount of up-time and the total amount of down-time for the line over a monitored period, and other possibly useful metrics. In this way, a better decision can be made as to the optimum profile to select for a particular connection, based on longer term performance.

Preferably the process also includes management of a Broadband Remote Access Server (BRAS) or similar interface device along the lines described in co-pending International patent application No. GB2006/002826 (Filed 28 Jul. 2006, entitled "Method and Apparatus for Communicating Data over a Data Network") and most preferably the process includes the DSLAM's generating the notifications in the manner described in co-pending International patent application No. GB2006/002818 (Filed 28 Jul. 2006, also entitled "Method and Apparatus for Communicating Data over a Data Network"); the contents of these applications are incorporated herein by reference.

Instead of having a DSLAM generate a notification in respect of each re-synch event, the DSLAM could monitor re-synch events locally and only generate a notification if more than a predetermined number of re-synchs are detected within a (short-scale) predetermined period. That is to say, instead of having the detection of very unstable lines carried out at a central management function, the function could be distributed to the DSLAM's.

Instead of relying on a DSLAM detecting the occurrence of a resynch event at the DSL connection layer, a higher or lower layer protocol could be used such as detecting that the ATM connection has gone down and/or come back up again, or detecting that a RADIUS transaction has occurred in respect of the corresponding DSL connection.

According to a second aspect of an exemplary embodiment, there is provided a method of controlling a data connection including first and second modems with a transmission line therebetween (the transmission line being most preferably a copper pair), the method comprising monitoring the stability of the connection over at least a first and a second time scale, wherein the monitoring over a first time scale detects a situation in which more than a predetermined number of problematic events occur within a first period and immediately altering one or more parameters of the operation of the data connection in an effort to improve the connection if such a situation is detected, and wherein the monitoring over a second time scale involves monitoring the connection over a longer period and modifying the parameters of operation on an infrequent basis, the infrequent basis having a period between modifications at least an order of magnitude greater than the first period.

According to a third aspect of an exemplary embodiment, there is provided a method of operating an access network including a plurality of data connections between end user devices and an aggregation transceiver device where the connections are aggregated for onward connection through the access network, the method comprising: storing a plurality of different profiles each of which specifies a set of values for a plurality of parameters associated with each data connection; and, in respect of each of the connections, performing the following: applying one of said stored profiles to the connection; monitoring the performance of the connection; periodically assessing the performance of the connection based on a plurality of performance metrics and determining which profile to apply to the connection based on the assessment, the method being characterized by, in respect of each connection, further monitoring each connection for the occurrence of one or more events or series of events indicative of the connection behaving very unstably and, upon detection of the occurrence of such an event or series of events, applying a different one of said profiles to the connection, without awaiting the next periodic assessment.

Preferably the event or series of events indicative of the connection behaving very unstably comprises observing more than a predetermined number of re-synchs of the connection within a predetermined short-term period. In one currently preferred embodiment the series of events indicative of the connection behaving unstably is the occurrence of ten or more re-synchs of a connection occurring within any one hour period.

Preferably the performance metrics include the number of re-synchs and errors occurring on a connection in a given period of time.

Further aspects of the present invention relate to systems, devices, computer programs and carrier means or media, and most particularly tangible carrier means such as an optical storage disk, a magnetic storage disk or solid-state non-volatile memory, as set out in the accompanying claims.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

The main embodiment described below uses a management device 100 to perform two principal functions—Broadband Access Remote Server (BRAS) provisioning and Dynamic Line Management (DLM). The BRAS provisioning is described in brief in this application, for the sake of completeness, but it is described in greater detail in co-pending International patent applications GB2006/002826 and GB2006/002818 both filed on 28 Jul. 2006, referred to above, for readers interested in the particulars of the preferred methods of BRAS provisioning applicable to the main embodiment.

As for the DLM function, this, as mentioned above, is desirable in the main embodiment because the downstream speed of the ADSL connections controlled by the management device of the main embodiment rate adapts to the highest speed the line can support from 2 Mb to 8 Mb, as the ADSL connections are running at their maximum limits they are more susceptible to noise which can cause errors and spontaneous resynchronisations (resyncs).

In overview, the role of the DLM function of the management device is to ensure that the ADSL connections are as stable as possible, i.e. with as few errors and, in particular, as few resyncs as possible, whilst still providing a good connection for the end user in terms of bit-rate and latency. The DLM function does this by receiving data from DSLAM Data Collectors each day and processing this received data. The DLM function is then able to increase or decrease the noise margins and/or interleave levels as required by setting a new profile for each ADSL connection (using the existing provisioning systems for setting profiles at DSLAM's). This basic functionality is enhanced with logic to minimise churn or oscillation of profiles (by attempting to stabilise the DSLAM profile for each connection, rather than reacting to every relevant change in the environment of the connection which could cause the maximum stable profile applicable to change).

Main Embodiment

Figure 1:
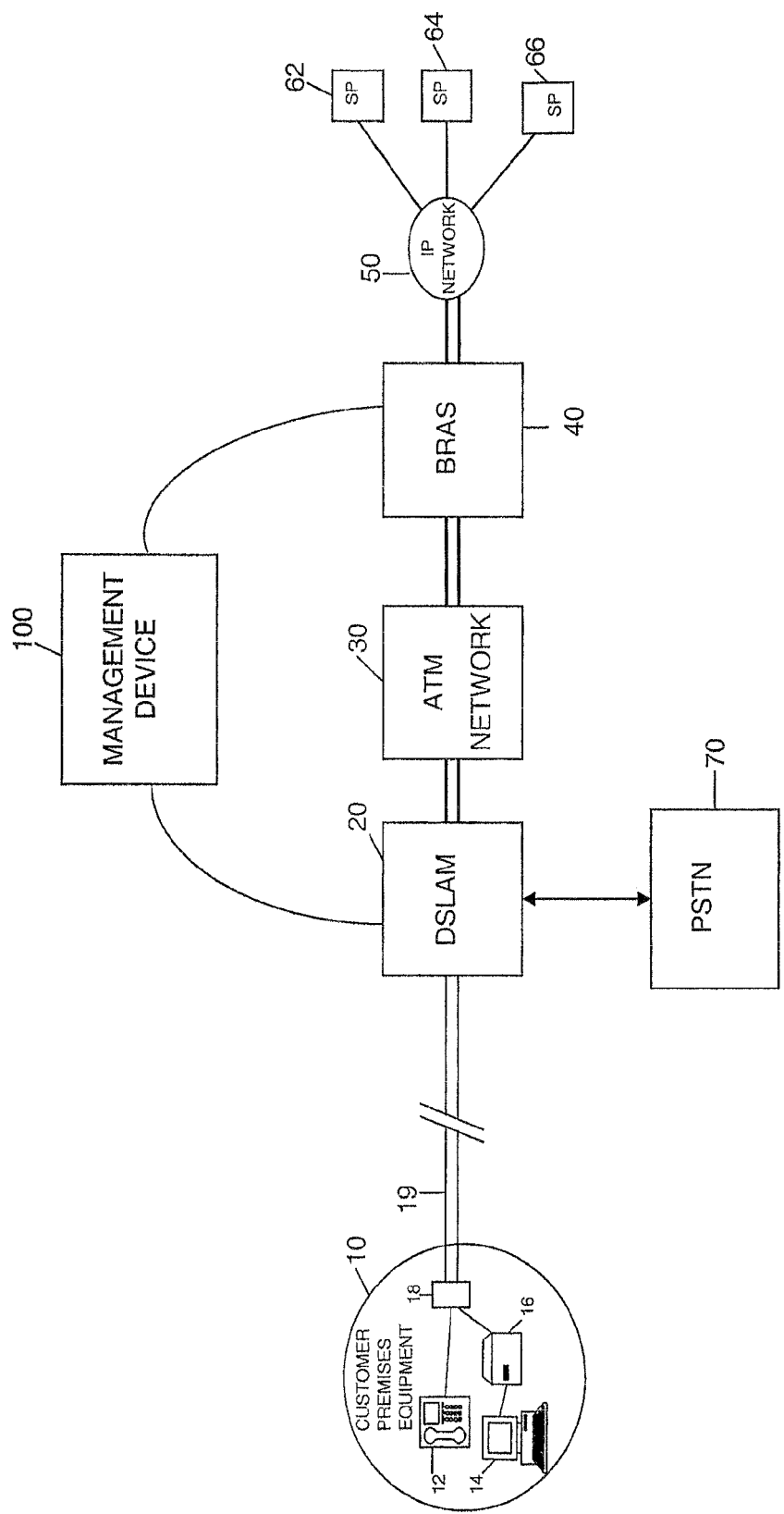
FIG. 1 is a schematic block diagram illustrating a telecommunications network incorporating a management device according to a first aspect of the present invention.

Referring to FIG. 1, a first embodiment of the present invention is illustrated in overview. A copper pair loop 19 (which forms part of the access network which extends between customer premises equipment 10 and the BRAS 40) connects customer premises equipment 10 to a DSLAM 20 located within a local exchange (also known as a central office in the US). The DSLAM separates normal voice traffic and data traffic and sends the voice traffic to the Public Switched Telephone Network (PSTN) 70. The data traffic is passed on through an Asynchronous Transfer Mode (ATM) network 30 which forms the remainder of the access network 19, 20, 30 (in the present embodiment, the ATM network 30 is British Telecom (BT)'s Multi Service intranet Platform (MSiP) ATM network). Connected to the ATM network 30 is a Broadband Remote Access Server (BRAS) 40 at which several IP traffic flows or ATM circuits from (and to) multiple Service Providers (SP's) 62, 64, 66 are aggregated (and disaggregated) via an IP network 50 (which in this case is BT's Colossus IP network)—which itself may run over an ATM network or networks. Within the customer premises equipment 10, there is an ADSL splitter filter 18, a telephone 12, an ADSL modem 16 and a computer 14.

In some cases the first hop of an IP packet traveling from computer 14 towards an ISP 62, 64, 66 would be the BRAS 40; whereas in other cases the first hop from an IP perspective could be beyond the BRAS 40.

In all cases, the end user's modem 16 creates a Point-to-Point Protocol (PPP) session from the modem to another device in the network. This is a logical end to end connection that carries the end user's traffic from the modem to the target IP network.

In some cases (e.g. in BT's Central+product), the PPP session is terminated on the BRAS, and then onward routed directly onto the Internet (e.g. via a core IP network such as BT's Colossus network).

In one example configuration where the PPP session is not terminated at the BRAS 40, the PPP session is terminated on a "home gateway" at the edge of the core network, connected to the Service Provider (SP). In another example configuration (e.g. such as in the BT Central+product) a Layer 2 Tunnelling Protocol (L2TP) tunnel is used to pass through the BRAS 40 to a terminating BRAS which belongs, to the SP; the L2TP tunnel tunnels all the PPP sessions into the SP network for them to handle as they want.

In all cases, the first IP hop is from the end user to the terminating BRAS (i.e. over the PPP connection). Furthermore, in all cases, the BRAS 40 is responsible for policing the amount of traffic flowing downstream (i.e. from the network towards the customer premises equipment) towards each line connected to the BRAS 40, to ensure that it does not exceed a maximum amount provisioned for that line. This policing is either done at the IP layer (where the BRAS 40 terminates a PPP connection from the customer premises equipment 10) or at a lower level (e.g. at the ATM layer) where there is some sort of sub-IP layer tunnelling through the BRAS 40.

The above mentioned arrangement of items 10, 19, 20, 30, 40, 50, 62, 64, 66 and 70 is conventional. However, in addition to this conventional arrangement, in the present embodiment there is a management device 100 which communicates with both the DSLAM 20 and the BRAS 40. The detailed operation of this device (especially as regards its DLM function) is explained in greater detail below with reference to FIGS. 2 and 3. However, in overview it obtains information from the DSLAM 20 about the rate at which each Digital Subscriber Line (DSL) connects to the DSLAM and information about events such as detected errors and/or resyncs occurring on the line/connection.

Figure 2:
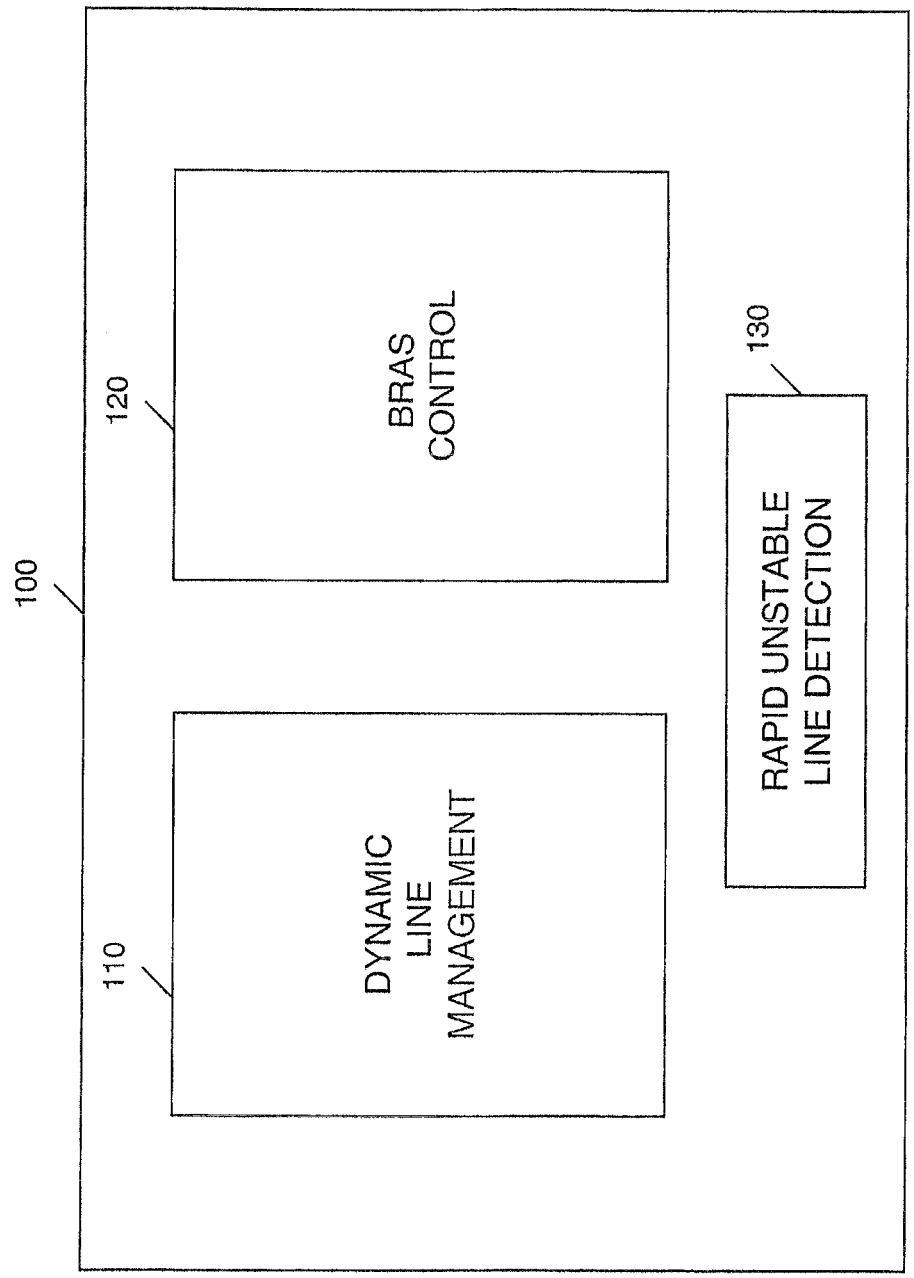
FIG. 2 is a schematic block diagram illustrating the management device of FIG. 1 in more detail.

As shown in FIG. 2, the management device 100 comprises two main functional parts, a BRAS provisioning or BRAS control function 120 and a Dynamic Line Management (DLM) function 110 and a rapid unstable line detection function 130.

The BRAS provisioning function 120 processes part of the information received from the DSLAM's to assess a consistent connection speed achieved by each DSL. If it determines that this consistent rate has increased as a result of recent higher rate connections, it instructs the BRAS to allow higher through flows of traffic for that DSL. On the other hand, if it detects that a particular connection speed is below the stored consistent value, it reduces the consistent value to the current connection rate and immediately informs the BRAS of the new consistent value rate so that the BRAS does not allow more traffic to flow to the DSL than the DSL is currently able to cope with.

Precise details of some of the algorithms which may be used by the BRAS Control function 120 of the management device 100 to calculate a consistent rate in the present embodiment are described in co-pending International applications GB2006/002826 and GB2006/002818. However, it should be noted that the intention of these algorithms is to arrange that the user will receive data at the highest rate which his/her DSL is consistently able to obtain without requiring the BRAS to be reconfigured every time the DSL is connected at a new maximum rate. At the same time the algorithms seek to ensure that if a DSL connects at a rate which is below that at which the BRAS is currently configured to allow data through for that DSL, then the BRAS is quickly reconfigured to avoid overloading the DSLAM.

Details of the particular algorithm employed in the present embodiment by the DLM function are set out below. In overview, however, the DLM function receives a new file daily from each element manager containing up to 96 timeslots (15 minute period) per end user per day. This data is used in the DLM analysis to determine if changes to the DSLAM profile are required to stabilise the end user's service. If changes are required, the DLM function sends a request to the Operational Support System (OSS) of the access network for the profile applied to the line to be changed. The precise way in which this is performed will depend on the details of the OSS of the particular access network and is not relevant to the present invention and so will not be described further herein.

The management device as a whole operates in a two-fold manner with regards to DLM. As noted above, the main source of input data for the DLM function is a daily file from each element manager, giving an aggregated report of each line's activity over the preceding 24 hours. This results in a change in DSLAM profile being applied no more frequently than once every 24 hours which is advantageous because it avoids the possibility of the DSLAM being reconfigured every time a line re-syncs.

The reason for wanting to avoid having to contact the BRAS or the DSLAM each time a DSL connects to the DSLAM is because with current systems it is not generally possible to reconfigure either the BRAS or the DSLAM without a significant delay (e.g. of a few minutes et least). Furthermore, there is a limit to the rate at which a BRAS or DSLAM can process reconfiguration requests. These restrictions are sometimes referred to by saying that the BRAS and DSLAM's need to be provisioned, and drawing a distinction between systems which are switched (e.g. ATM Switched Virtual Circuits) and systems which are provisioned. Current systems allow for quite quick provisioning (often a matter of minutes rather than days or weeks) but there is still a significant difference between such quick provisioning and realtime switching.

However, as well as receiving the majority of the data on which it makes decisions about whether or not to set a new profile for a particular DSL only every 24 hours, there is a second route by which the DLM function can receive data in a much more dynamic manner in order to quickly reconfigure the respective DSLAM if a line is behaving so unstably as to severely impair an end user's service experience to the extent that the user would be likely to raise a fault or complaint with the network operator or his/her Internet Service Provider.

In overview, the DLM performs two main subfunctions in carrying out its main function of monitoring and, from time to time, reconfiguring the DSLAMs to try to maintain each DSL operating at its optimum profile. The first sub-function processes the bulk data (which, in the present embodiment, is received every 24 hours or so) to categorize each line in terms of its stability. The second subfunction determines for each line, based on its categorization and historical data stored about that line, whether or not to request a change in profile applied to that line.

The DSLAM profile has two parameters which are adjusted in the various different profiles available for the DLM function to choose between in order to improve the stability of the line: the target margin and the run mode (the latter enabling the use of interleaving). The default line profile which is initially applied to all lines has a target margin of 6 db and interleaving disabled (often referred to as being in fast mode). Changing these parameters is based on three performance metrics, errors (in particular, in this embodiment, errors caused by code-violations re-trains (i.e. re-syncs) and failed initialisations.

Errors and re-trains are normalised to up-time (total synchronised time during the period). For example 100 errors in 10 hours of up-time after normalisation is (quite sensibly) very different from 100 errors in 1 minute of up-time.

A move over to an interleaved profile is made in preference to a change in the target margin. Initially an interleaved profile is set with the same corresponding target margin as the previous fast mode profile (i.e. 6 dB fast would transition to 6 dB interleaved).

If a customer has opted-out of the option to apply interleaving (e.g. because low latency is more important to them than maximum bit-rate—such as is often the case for customers who are on-line garners or VOIP or video conference users) then transitions are only made between fast mode profiles (only the target margin is varied). This clearly limits the capability of the DLM process.

A check is made against line rate to ensure that a line is capable of making the transition to a new profile without suffering a bit rate drop so drastic that it would fall below a predetermined minimum acceptable bit rate. A transition is only made if there is some confidence that the line will be capable of supporting service above this minimum acceptable rate once the new profile is applied. For example, in the present embodiment a transition to a higher noise margin profile is only made if the current bit rate is approximately 800 kbps greater than the Fault Rate (i.e. the minimum acceptable bit rate as determined by the network operator). If the line is unstable and yet cannot make the transition because it would drop below its minimum acceptable bit rate, then this is flagged for further investigation. In the present embodiment, the Fault Rate is initially set at 2 Mbs and then re-set to 70% of the Maximum Stable Rate detected by the network during the first 10 days of operation of the DSL in its rate adaptive mode.

If a line fails to synchronise then a transition will be made to a lower target margin. If this means returning to a previously unstable state then this is flagged for further investigation as the line is not effectively stabilised (even though it isn't at the maximum target margin). The line is returned to the previous unstable state so that some level of service can be provided to the customer whilst an investigation takes place.

If a line fails to synchronise even at the lowest target margin then it is flagged for investigation. For example, it may not be able to support the required service or the line may be faulty.

Similarly, if a line is still unstable at the maximum possible target margin then it is flagged for further investigation. For example the line may be faulty.

If a line is completely stable then in general the DLM function moves the line to a lower target margin (or interleave depth) to increase the available capacity (or reduce the latency) on the line (remember 3 dB-800 kbps). However, these transitions are handled carefully to avoid frequent changes in target margin (or interleave depth) up and down. Thus if a line has previously been moved from the more aggressive lower target margin (or less interleaved) profile to the current target margin, it must wait a considerably longer time (e.g. a week, or a month) before being re-transitioned back to the lower target margin (or interleave depth) profile than if it has not previously been moved back from the lower target margin (or interleave depth) profile.

In the present embodiment, there is a manual process to enable the transition between any line profile (e.g. 3 dB fast straight to 15 dB interleaved is possible by manual intervention).

In the present embodiment, those lines, which have been flagged for further investigation are pro-actively repaired in the hope that they can be repaired before any fault report is generated.

Re-profiling requests to improve stability occur on a daily basis or as soon as a line is discovered to be very unstable as discussed below. Re-profiling decisions on stable lines to move to a more aggressive profile to increase overall capacity are made over a longer time period as discussed in the preceding paragraph.

In the present embodiment, each line is categorized by the first subfunction of the DLM function into one of four different categories in dependence upon the normalised number of errors and/or re-syncs as reported to the DLM function in the bulk file. The categories correspond to very poor, poor, acceptable and very stable.

Figure 4:
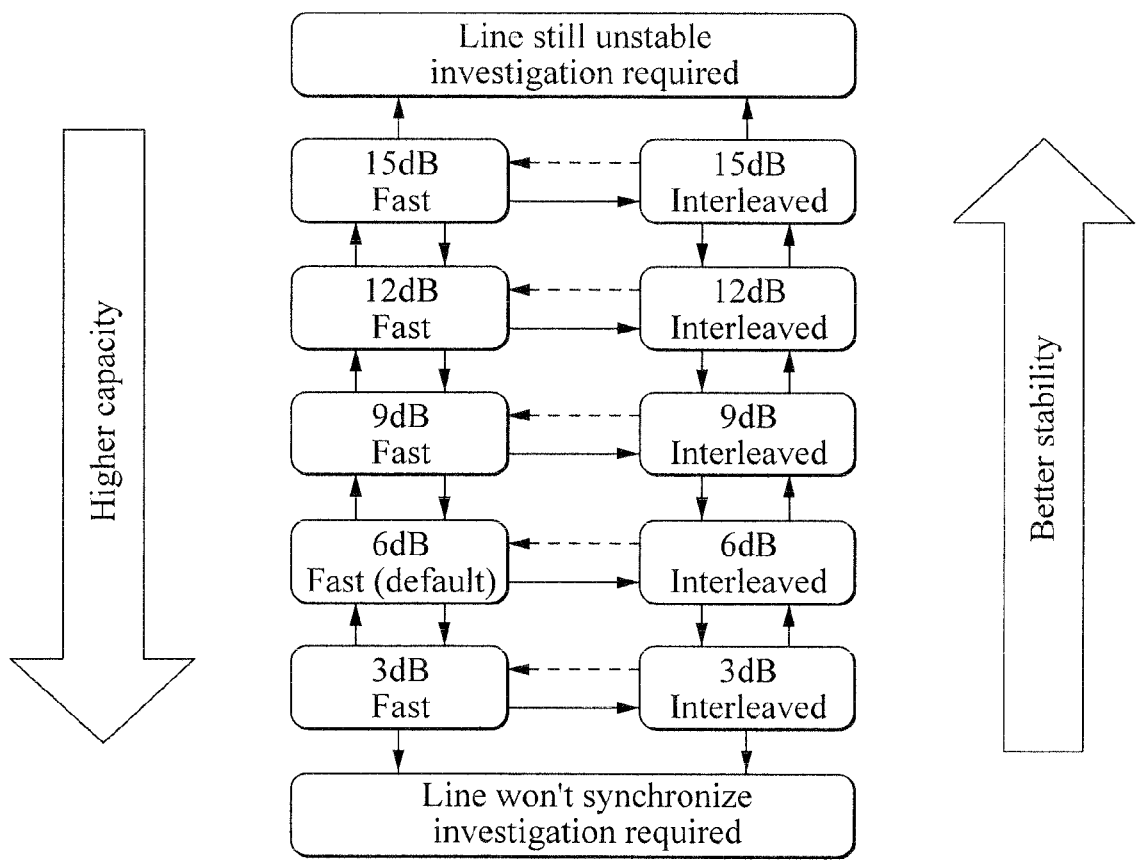
FIG. 4 shows the basic flow of a Dynamic Line Management (DLM) process in accordance with certain exemplary embodiments.

The basic flow of the DLM process is shown in FIG. 4.

In the present embodiment, the general progression through the profiles shown in FIG. 4 is as follows: if a line is to be changed to a more stable profile, the first change is to move to the profile with the same target margin but in interleaved mode instead of fast mode, if the line is already in an interleaved mode, then the line is moved to the next higher target margin profile also in interleaved mode. If the line is to be moved in the direction of increased capacity, it is kept in the same mode (i.e. fast or interleaved) but moved to the next lower target profile, unless it is at the minimum target margin in interleaved mode, in which case it is moved to the minimum target margin profile in fast mode.

In the second sub-function of the DLM function, a line categorized as very poor is immediately moved two steps in the better stability direction (e.g. from 6 dB Fast profile it would move to 9 dB Interleaved, from 6 dB Interleaved it would move to 12 dB Interleaved, etc.). A line categorized as poor is immediately (although with lower priority than the re-profiling of any very poor categorized lines) moved one step in the better stability direction (e.g. from 6 dB Fast to 6 dB Interleaved or from 9 dB interleaved to 12 dB Interleaved). A line categorized as acceptable is maintained on its current profile (i.e. no action is taken). A line categorized as very stable is moved (if the further requirements to avoid oscillations etc. are also satisfied) one step in the higher capacity direction (e.g. from 6 dB Fast to 3 dB Fast, from 9 dB interleaved to 6 dB Interleaved or from 3 dB Interleaved to 3 dB Fast).

In the present embodiment, the fast track process performed by the rapid unstable line detection function 130 of the management device 100, by which very unstable lines are detected, and a request for their profile to be changed, as soon as this is detected, is issued to the OSS, is now described below with reference to FIG. 3. In brief, in the present embodiment, each DSLAM sends a notification to the rapid unstable line detection function 130 which monitors to see if more than a predetermined number of resyncs have occurred for a particular line within a particular period, and if so the line is categorized as very poor and this categorization is sent directly to the second subfunction of the DLM function which then causes an immediate high priority request to be issued to the OSS system to cause the respective DSLAM to change the profile applied to the unstable line. In the present embodiment, the resync notifications which are sent to and used by the rapid unstable line detection function 130 are the same notifications as are generated by the DSLAMs and sent to the BRAS control function 120 each time a spontaneous resync occurs, so that the BRAS control function may quickly reconfigure a BRAS if a line is detected as re-syncing at a rate below that at which the BRAS is configured for that line (thus causing possible problems at the DSLAM because of more data arriving there than it can forward along the DSL line) as is described in greater detail in co-pending PCT application GB2006/002818.

Figure 3:
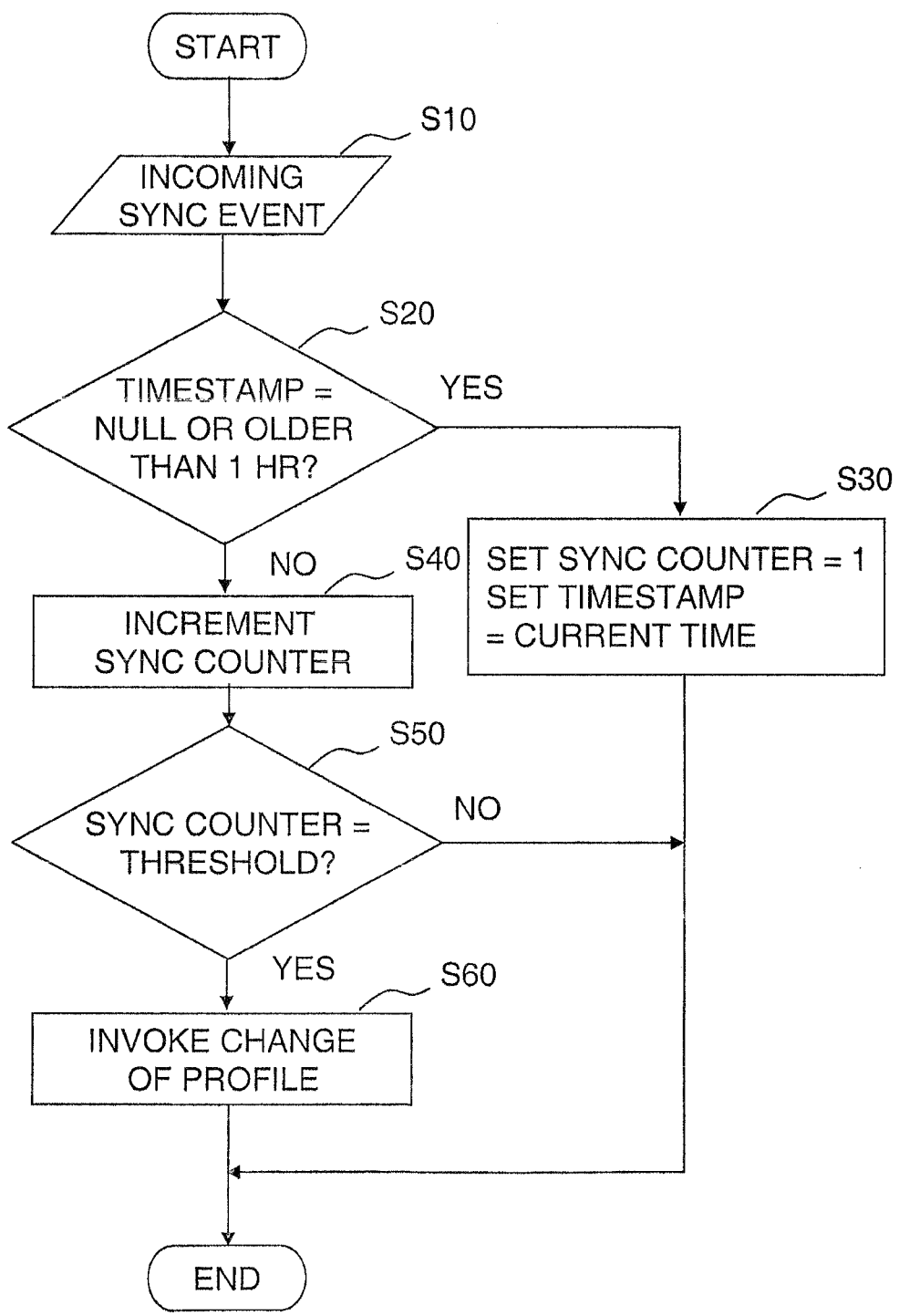
FIG. 3 is a flow diagram illustrating the steps carried out by the management device of FIG. 1 in order to control the stability of the DSL connections in the network of FIG. 1.

Referring now to FIG. 3, the steps performed by the rapid unstable line detection function 130 are as follows.

The method is run whenever a notification that a resync (or an initial synchronisation) is received at step S10. Upon its receipt, the method checks (at step S20) to see if a timestamp for the respective line is either null (i.e. it has not yet been set, e.g. because this is the first time that the line has synced up under the rate adaptive mode) or older than an hour (note that in alternative embodiments this time period can be set to any value, though there is not much point in setting this to a period longer than the interval between receipt by the DLM function of the bulk files—every 24 hours in the present embodiment). If so, then the method proceeds to step S30 in which a sync counter variable for that line is set to 1 and a timestamp variable for that line is set to the current time and then the method ends.

If it is determined at step S20 that the timestamp for the respective line about which a sync event notification has just been received is not null and is less than an hour old the method proceeds to step S40 (note that the time stamp should include date information to prevent resyncs which occur between (n*24) and (n*24)+1 hours later from being counted—this can be done by using a time notation such as UTC time or Unix time, or simply by including a date together with the time).

At step S40 the sync counter variable for the respective line is incremented (by one) and then the method proceeds to step S50.

At step S50 the sync counter for the respective line is compared with a threshold value which in the present embodiment is set to 10. If the sync counter variable is not equal to (i.e. is less than) this threshold value then the method ends. Otherwise the method proceeds to step S60 in which a change of profile is invoked and then the method ends. In the present embodiment, the step of invoking a change of profile is carried out by categorizing the line as very poor and notifying this directly to the second sub-function of the DLM function so that it immediately issues a high priority request to the OSS system to cause the respective DSLAM to change the profile applied to the unstable line.

Alternatives

Instead of having the DSLAM's (or alternatively element managers or other intermediary devices between the DSLAM's and the management device 100) generate and send a notification to the management device for each sync event, each DSLAM (or element manager etc.) could perform the steps of FIG. 3 and categorize the respective line as very poor itself, and then send the notification of the very poor categorization to the DLM function for immediate actioning. Taking this distributed approach one step further, the DSLAM could even apply the new profile itself automatically. In this way the management device could do without the rapid unstable line detection function altogether. In such a case the bulk file would include information about any such re-profilings performed by the DSLAM so that this could be taken into account by the DLM function of the management device.

Instead of or in addition to relying on notifications from the DSLAM about sync events over the DSL connection, the DLM function could use notifications about events occurring at higher layers (in the sense used in the OSI 7 layer reference model of data communications) in the communication channel (e.g. from other pieces of equipment). For example, whenever a DSL connection is lost and a resync is required, the computer attached to the remote ATU will tend to have to initiate a new transaction with an AAA server using the RADIUS protocol and this can be used as an indication of a sync event for the purposes of detecting an unstable line. Similarly a break in an IP/TCP connection could also be used as an indication, or a notification from an ATM switch that an ATM connection has been lost or made, etc.

What is claimed is:

1. A method of controlling a data connection including first and second modems with a transmission line there between, the method comprising:

executing a first and a second monitoring process for monitoring stability of the data connection over a first and a second time scale respectively, wherein the first monitoring process comprises periodically assessing performance of the data connection based on performance metrics pertaining to the performance of the data connection since the preceding periodic assessment of the first monitoring process, with the period between consecutive periodic assessments corresponding to the first time scale, and, in the event that it is assessed that a modification to operational parameters of the data connection is appropriate, modifying the operational parameters of the data connection in dependence upon the assessment, wherein the second monitoring process comprises detecting the occurrence of one or more events or series of events indicative of the data connection behaving unstably within a second period of time from completion of the occurrence and, in response to such detection, modifying the operational parameters of the data connection, wherein the second monitoring process is completed within a period of time corresponding to the second time scale which is within the period between consecutive periodic assessments of the first monitoring process and is completed without awaiting the next periodic assessment of the first monitoring process after completion of the occurrence of one or more events or series of events indicative of the data connection behaving unstably, and wherein the first and second modems are digital subscriber line modems.

2. The method according to claim 1, wherein the first and second monitoring processes are different from one another and operate concurrently.

3. The method according to claim 1, wherein each of the first and second monitoring processes operate repeatedly, and wherein the first and second monitoring processes operate concurrently.

4. The method according to claim 1, wherein the first and second monitoring processes are different from one another and operate concurrently.

5. The method according to claim 1, wherein each of the first and second monitoring processes operate repeatedly, and wherein the first and second monitoring processes operate concurrently.

6. Carrier means comprising a non-transient storage medium carrying a computer program or a suite of computer programs for causing the method of claim 1 to be carried out during execution of the program or programs.

7. A method of controlling a data connection including first and second modems with a transmission line therebetween, the transmission line comprising a pair of copper wires, the method comprising:

monitoring stability of the data connection over at least a first and a second time scale, wherein the monitoring over a first time scale detects a situation in which more than a predetermined number of problematic events occur within a first period and altering one or more parameters of operation of the data connection in an effort to improve the data connection if such a situation is detected, wherein the monitoring over a second time scale involves monitoring the data connection over a longer period and modifying the one or more parameters of operation on an infrequent basis, the infrequent basis having a period between modifications at least an order of magnitude greater than the first period, wherein the monitoring over the first and second time scales is performed concurrently, and wherein the monitoring over the first time scale is performed continuously and is always operable, within a period of two hours or less from completion of the occurrence of more than a predetermined number of problematic events to both:

detect a situation in which more than a predetermined number of problematic events have occurred within the first period; and alter one or more parameters of the operation of the data connection accordingly.

8. The method according to claim 7, wherein the first and second modems are digital subscriber.

9. Carrier means comprising a non-transient storage medium carrying a computer program or a suite of computer programs for causing the method of claim 7 to be carried out during execution of the program or programs.

10. A management device for use in an access network including a plurality of data connections between end user devices and an aggregation transceiver device where the data connections are aggregated for onward connection through the access network, the management device being configured to perform, in respect of each of the data connections, a first and a second monitoring process for monitoring stability of the respective data connection over a first and a second time scale respectively, wherein the first monitoring process comprises periodically assessing performance of the respective data connection based on performance metrics pertaining to the performance of the respective data connection since the preceding periodic assessment of the first monitoring process, with the period between consecutive periodic assessments corresponding to the first time scale, and, in the event that it is assessed that a modification to operational parameters of the respective data connection is appropriate, modifying the operational parameters of the respective data connection in dependence upon the assessment, and wherein the second monitoring process comprises detecting the occurrence of one or more events or series of events indicative of the respective data connection behaving unstably within a second period of time from completion of the occurrence and, in response to such detection, modifying the operational parameters of the respective data connection, wherein the second monitoring process is completed within a period of time corresponding to the second time scale which is within the period between consecutive periodic assessments of the first monitoring process and is completed without awaiting the next periodic assessment of the first monitoring process after the completion of the occurrence of one or more events or series of events indicative of the respective data connection behaving unstably, and wherein at least some of the data connections are digital subscriber line connections.

11. An access network including a management device according to claim 10.

12. The management device according to claim 10, wherein the first and second monitoring processes are different from one another and operate concurrently.

13. The management device according to claim 10, wherein each of the first and second monitoring processes operate repeatedly, and wherein the first and second monitoring processes operate concurrently.

14. The management device according to claim 10, wherein the first and second monitoring processes are different from one another and operate concurrently.

15. The management device according to claim 10, wherein each of the first and second monitoring processes operate repeatedly, and wherein the first and second monitoring processes operate concurrently.

16. A management device for use in an access network including a plurality of data connections between end user devices and an aggregation transceiver device where the data connections are aggregated for onward connection through the access network, the management device being configured, in respect of each of the data connections, to monitor stability of the respective data connection over at least a first and a second time scale, wherein the monitoring over a first time scale detects a situation in which more than a predetermined number of problematic events occur within a first period and altering one or more parameters of operation of the respective data connection in an effort to improve the respective data connection if such a situation is detected, wherein the monitoring over a second time scale involves monitoring the respective data connection over a longer period and modifying parameters of operation on an infrequent basis, the infrequent basis having a period between modifications at least an order of magnitude greater than the first period, wherein the monitoring over the first and second time scales is performed concurrently, and wherein the monitoring over the first time scale is performed continuously and is always operable, within a period of two hours or less from completion of the occurrence of more than a predetermined number of problematic events to both:

detect a situation in which more than a predetermined number of problematic events have occurred within the first period; and alter one or more parameters of the operation of the data connection accordingly.

17. The management device according to claim 16, wherein at least some of the connections are digital subscriber line connections.

\* \* \* \* \*